Figure 1:
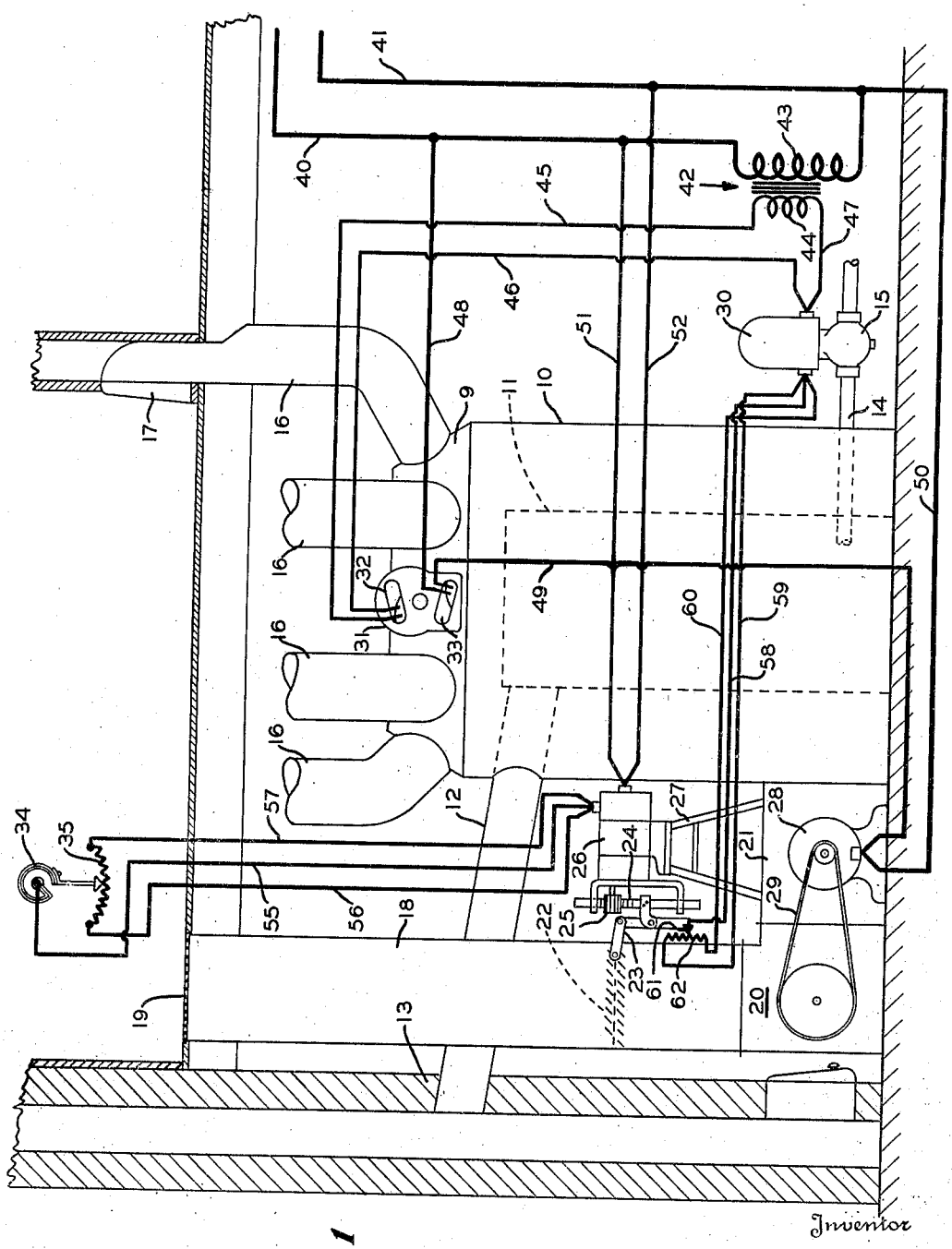

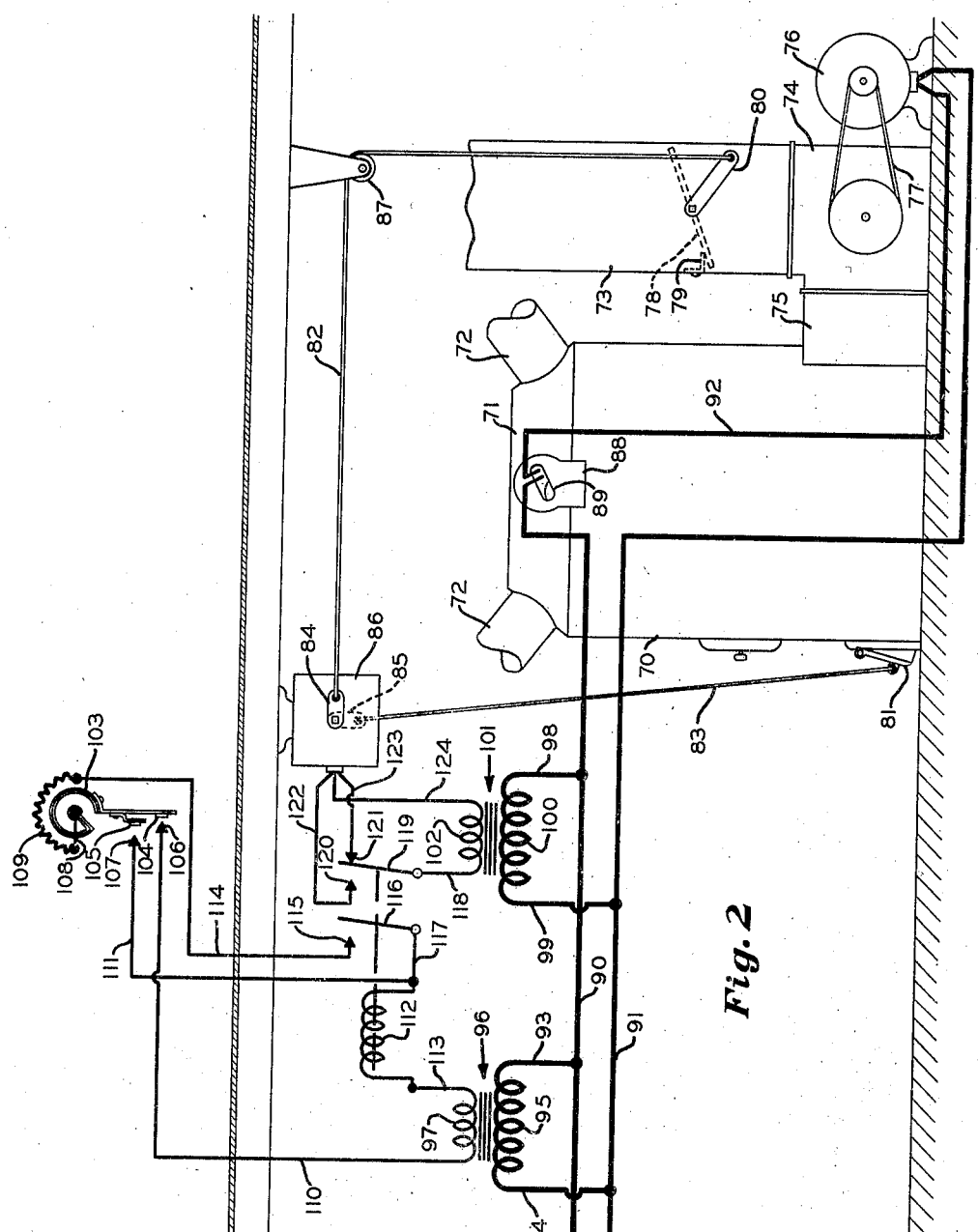

Patented June 14, 1938

2,120,803

UNITED STATES PATENT OFFICE 2,120,803

HEATING SYSTEM

Arthur C. Grant, St. Paul, Minn., assignor to Minneapolis-Honeywell Regulator Company, Minneapolis, Minn., a corporation of Delaware Application February 4, 1935, Serial No. 4,806

21 Claims. (Cl. 236—11)

This invention relates to a control system and is more specifically directed to control systems for heating systems.

It is an object of this invention to provide a control system for a heating system wherein the heating fluid delivered to the space to be heated and the temperature of the heater is varied according to changes in the temperature of the space to be heated.

Another object is to provide a control system for a heating system wherein the circulatory movement of the heating fluid is started and stopped according to heater conditions and wherein the amount of heating fluid so circulated is varied according to changes in temperature of the space to be heated.

A further object is to provide a heating control system wherein the circulatory movement of the heating fluid is started and stopped according to heater temperatures and wherein the amount of heating fluid so circulated and the temperature of the heater are varied according to changes in temperature of the space to be heated.

It is an object of one form of this invention to provide a control system for a heating system wherein the amount of heating fluid delivered to the space to be heated and the amount of fuel fed to the heater is varied proportionately to variations in the temperature of the space to be heated.

Another object of this form of the invention is to provide a control system for a heating system wherein the amount of heating fluid delivered to the space to be heated is varied in proportion to changes in temperature of the space to be heated and wherein the fuel supply to the heater is controlled by variations in temperature of the space to be heated and by changes in heater conditions.

Still another object of this form of the invention is to provide a heating control system wherein the circulatory movement of the heating system is primarily controlled according to changes in a condition of the heater and wherein it is secondarily controlled according to changes in temperature of the space to be heated with provision for controlling the condition of the heater according to changes in the temperature of the space to be heated and according to changes in the condition of the heater.

An object of another form of my invention is to provide a heating control system wherein the circulatory movement of the heated fluid is started and stopped according to heater temperatures and wherein the amount of heating fluid so circulated and the temperature of the heater is varied by an auxiliary heater type thermostat which is responsive to changes in temperature of the space to be heated.

Still another object of this invention is to provide a combination of control elements related in such manner that a sensitive and accurate control over a heating system is obtained whereby the over-all efficiency of the system is increased and unevenness of control caused by "over-shooting" and "under-shooting" is eliminated.

Other objects and advantages will become apparent to those skilled in the art by referring to the accompanying specification, claims and drawings in which:

Fig. 1 is a diagrammatic showing of a domestic heating system with one form of the control system of this invention associated therewith and, Fig. 2 is a diagrammatic showing of a domestic heating system with another form of control system of this invention associated therewith.

Referring now to Fig. 1, the heating system of this modification comprises a heater which may be in the form of a warm air furnace designated at 10 and having a bonnet 9. Located within the heater or furnace 10 is a heat exchanger 11 having a flue 12 extending therefrom through the furnace 10 and outwardly to a suitable stack or chimney shown at 13. A fuel feeding means which may be in the form of a pipe is designated at 14 and the flow of fuel therethrough is controlled by means of a valve 15. Although the fuel feeding means is shown to be a pipe 14 for conveying liquid or gaseous fuel to the heat exchanger 11 it may be of any type. This invention contemplates the use of and control of gas or liquid or solid fuel.

Leading from the bonnet 9 of the furnace 10 are ducts 16 which extend upwardly and terminate in registers 17 for delivering heated air from the furnace 10 to the rooms or spaces to be heated. Cold air is returned from the rooms or spaces to be heated to the furnace or heater 10 through a cold air return grating 19, a cold air return duct 18, a fan mechanism 20 and an inlet duct 21.

Located in the cold air return pipe 18 are louvers or dampers 22 which are moved between open and closed positions by means of a linkage 23 connected to a reciprocating rack 24 which is operated by a rotary pinion 25. The rotary pinion 25 is driven by means of a proportioning or modulating motor 26, which may be of the type described and shown in U. S. Patent 1,989,972 granted to Lewis L. Cunningham on Feb. 5, 1935. The proportioning or modulating motor 26 is suitably supported by means of a support diagrammatically shown at 27. Since the construction and operation of the proportioning motor 26 is specifically shown and described in the above referred to patent, a detailed description here is not considered necessary.

The fan mechanism 20 comprises a fan which is driven by means of a motor 28 through the medium of a belt 29 to force air through the system in the manner pointed out above.

The valve 15 controlling the supply of fuel through the pipe 14 is operated by means of a proportioning or modulating motor 30 of the power failure type which may take the form that is shown and described in U. S. Patent 2,029,465 granted to Lewis L. Cunningham on Feb. 4, 1936, filed November 11th, 1933. Since the construction and operation of the proportioning motor 30 for operating the valve 15 is specifically shown and described in this Cunningham patent, a detailed description here is not considered necessary.

Located in the bonnet 9 of the furnace or heater 10 is a condition responsive device preferably in the form of a thermostatic switching mechanism of the type shown and described in Patent No. 1,951,663 to John P. Kriechbaum and patented March 20th, 1934. This thermostatic switching mechanism contains a high limit mercury switch 32, and a fan mercury switch 33. These switches contain suitable electrodes as shown to be engaged by the usual mercury upon tilting of the switches to closed circuit positions in a manner to be described hereafter. The thermostatic device 31 and the switches 32 and 33 contained therein are so arranged and operated that upon a rise in temperature in the bonnet 9 to a predetermined value, switch 32 is opened thereby effecting a high limit safety control of the circuit controlled thereby and upon a rise in temperature in the bonnet 9 to another predetermined value switch 33 is closed. Upon the lowering of the temperature to a lesser predetermined value, switch 33 is opened. The switch 33 is therefore responsive to selective differential heater temperatures for starting and stopping the fan mechanism 20.

Located in one of the rooms or spaces to be heated is a condition responsive device which may take the form of a thermostat 34, having a slider which is adapted to contact and slide across a potentiometer coil 35 according to temperature changes existing within the room or space to be heated.

Leading from some source of power, not shown, to a primary 43 of a step-down transformer generally designated at 42 are line wires 40 and 41. One end of the secondary 44 of the step-down transformer 42 is connected by means of a wire 45 to one of the electrodes of high limit switch 32. The other electrode of the high limit switch 32 is connected by means of a wire 46 to the proportioning or modulating motor 30 and this proportioning or modulating motor 30 is in turn connected by means of a wire 47 to the other end of the secondary 44 of the step-down transformer 42 so that when the high limit switch 32 is closed, energy is supplied to the proportioning motor 30 of fuel valve 50.

The line wire 40 is also connected by means of a wire 48 to one of the electrodes of the fan switch 33 and the other electrode of the fan switch 33 is connected by means of a wire 49 to the electric motor 28 which in turn is connected by means of a wire 50 to the line wire 41 so that when the fan switch 33 is closed, the motor 28 is energized to operate the fan mechanism 20.

The proportioning motor 26 which operates the louvers 22 is connected by means of wires 51 and 52 to the line wires 40 and 41 respectively so that energy is always supplied to the proportioning motor 26. The thermostat 34 and each end of the potentiometer coil 35 are connected by means of wires 55, 56 and 57 respectively to the proportioning motor 26 in the manner shown in the first mentioned Cunningham patent to control the operation thereof.

Carried by a moving part of the proportioning motor 26 is a slider arm 61 which is adapted to engage and slide over a potentiometer coil 62 so that for a given position of the parts of the proportioning motor 26, the slider arm 61 assumes a like position with respect to the coil 62. Although I have shown the slider 61 to be operated by the linkage 23, it may in practice be operated by any movable part of the proportioning motor. The slider 61 and each end of the potentiometer coil 62 are connected by means of wires 58, 59 and 60 respectively to the proportioning motor 30 to control the operation thereof.

The operation of the proportioning motor 26 may be briefly stated as follows: with the parts in the positions shown in Fig. 1, upon a rise in temperature in the space to be heated, the thermostat will move the slider to the right along the potentiometer coil 35, causing an unbalancing of the resistances therein. The effect of these unbalanced resistances is transmitted by wires 55, 56 and 57 to the proportioning motor 26 to cause the same to move the rack 24 and consequently the louvers 22 toward a closed position a predetermined amount. By reason of a follow up mechanism located within the proportioning motor 26, the proportioning motor 26 and consequently the louvers 22 are positioned in direct relation to the temperature existing within the space to be heated. Upon a decrease in temperature in the space to be heated, the slider of the thermostat 34 is moved to the left along the potentiometer coil 35 to cause a reverse unbalancing of the resistances in the potentiometer coil 35 to cause the proportioning motor 26 to move the louvers 22 a predetermined distance toward the open position. The louvers 22 are opened in direct relation to the temperature decrease in the space to be heated. From the above, it is seen that the rack 24 and louvers 22 assume given positions in direct response to the temperature existing in the space to be heated.

Since the rack 24 is moved in proportion to temperature changes existing within the space to be heated and since the slider 61 is carried by the rack 24, the slider 61 will be moved along the potentiometer coil 62 in proportion to temperature changes existing within the space to be heated. Movement of the slider 61 in this manner along the potentiometer coil 62 causes unbalancing of resistances therein and the effect of these unbalanced resistances is transmitted by wires 58, 59 and 60 to the proportioning motor 30 to operate the same to proportionately position the valve 15 between open and closed positions according to temperature changes existing within the space to be heated.

From the above, it is seen that both the louvers 22 and the valve 15 are proportionately opened and closed in response to temperature variations in the space to be heated. By reason of this proportioning control, the amount of heating fluid or air circulated through the system and the temperature of the heater is varied in direct proportion to temperature variations in the space to be heated so that a fine and accurate control is obtained whereby "over-shooting" and "under-shooting" are prevented.

With the parts in the positions shown in Fig. 1 of the drawings, mercury switches 32 and 33 are in closed circuit positions and a circuit is completed from the secondary 44 of the step-down transformer 42 through wire 45, mercury switch 32, wire 46, proportioning motor 30 and wire 47 back to the secondary 44 to permit energization of the proportioning motor 30. Another circuit is completed from line wire 40 through wire 48, mercury switch 33, wire 49, fan motor 28 and wire 50 back to the line wire 41 to maintain the fan motor 28 and consequently the fan mechanism 20 in operation. Upon a rise in bonnet temperature above a predetermined value, switch 32 is moved to an open position to effect a high limit cut-out to prevent energization of the proportioning motor 30 whereby the valve 15 is moved to a closed position since the proportioning motor 30 is of the power failure type. Upon a decrease in temperature existing in the bonnet 9 below a predetermined value, mercury switch 33 is moved to an open position to stop operation of the fan motor 28 and the fan mechanism 20 to prevent circulation of the air or heating fluid through the system. In this manner, cold air is prevented from being circulated through the system.

From the above, it is seen that the fan mechanism 20 is started and stopped according to selected differential temperatures existing in the bonnet 9 whereby the movement of the circulating fluid from the furnace or heater 10 through the duct 16 into the space to be heated and the return of cold air through the cold air return pipe 18 and the inlet 21 to the heater 10 is controlled by the heater 10. It is also seen from the above, that the amount of circulation or rate of flow of heating fluid and the amount of fluid delivered to the heater and consequently the temperature of the heater is directly and proportionately controlled according to variations in the room temperature.

Having referred to Fig. 1, it is seen that I have provided in this modification a control system for a heating system having a heater and heating fluid conveying means adapted to heat a space, which control system comprises: a fan for circulating the fluid through the fluid conducting means; a fan switch responsive to a predetermined high temperature of the heater for starting the fan and responsive to a predetermined low temperature for stopping the fan; louvers in the fluid conducting means for controlling the rate or flow of heating fluid which are proportionately opened or closed according to variations in room temperature; a valve for controlling the flow of fuel to the heater which is proportionately opened or closed according to variations in room temperature and a high limit safety device responsive to a predetermined high bonnet temperature for closing the fuel valve.

Referring now to Fig. 2, I have shown a heater which may take the form of a warm air furnace 70, having a bonnet 71. Leading upwardly from the bonnet 71 to the rooms or spaces to be heated are ducts 72 for conveying heated air to said rooms or spaces. A cold air return duct 73 conveys cold air from the space to be heated through a fan mechanism 74 and a cold air inlet 75 to the heater 70. The fan mechanism 74 is operated by means of a fan motor 76 through the medium of a belt 77.

Located in the cold air return duct 73 is a damper 78 which is adapted to be moved between closed and opened positions. An adjustable stop 79 is located in the cold air return duct 73 to prevent complete closure of the damper 78 so that some circulation of the heating fluid will always be present when the fan mechanism 74 is in operation to prevent a cold sensation, sometimes termed "cold 70" from existing in the spaces or rooms to be heated. The damper 78 is moved between opened and closed positions by means of an arm 80 connected thereto. The heater or furnace 70 is fired in the usual manner and the amount of draft therethrough and consequently the temperature thereof is controlled by means of a draft door 81.

Cables or chains 82 and 83 extend from the arm 80 of the damper 78 and the draft door 81 respectively to arms 84 and 85 respectively of a damper motor 86 which may be of the type shown and described in Patent No. 1,835,307 to Roy W. Johnson, patented December 8th, 1931. The chain or cable 82 passes over a suitable pulley mechanism 87. Upon operation of the damper motor 86, the draft door 81 and the damper 78 are opened or closed.

Located in the bonnet 71 of the heater 70 is a condition responsive device which may take the form of a thermostatic switching mechanism of the type shown and described in Patent No. 1,782,530 to Charles P. Dougherty and patented November 25th, 1930. This condition responsive device 88 operates a mercury switch 89 having the usual electrodes and mercury contained therein. Upon a rise in temperature above a predetermined value, the switch 89 is moved in circuit closing position and upon a decrease in temperature to a value less than the first predetermined value, the switch 89 is moved to circuit opening position.

Leading from some source of power not shown are line wires 90 and 91. Line wire 90 connects to one electrode of the mercury switch 89 and the other electrode of the mercury switch 89 is connected by means of a wire 92 to the fan motor 76. The line wire 91 is also connected to fan motor 76. When the switch 89 is moved to a closed position in response to the existence of a predetermined high temperature within the bonnet 71, a circuit is completed from line wire 90 through the mercury switch 89, wire 92, and fan motor 76 to line wire 91 to cause energization of the fan motor 76 and consequent operation of the fan mechanism 74 to cause circulation of the heating fluid through the system. When the switch 89 is moved to circuit opening position in response to the existence of a predetermined low temperature in the bonnet 71, the above circuit is broken and the fan mechanism 74 is stopped to prevent the circulation of cold air through the rooms or spaces to be heated.

Wires 93 and 94 connect a primary 95 of a step-down transformer 96 to the line wires 90 and 91. This step-down transformer 96 is provided with a secondary 97. In a like manner, wires 98 and 99 connect a primary 100 of a step-down transformer 101 to the line wires 90 and 91. This step-down transformer 101 is provided with a secondary 102.

Located in one of the rooms or spaces to be heated is an auxiliary heater type thermostat 103 which carries contacts 104 and 105. The contacts 104 and 105 are adapted to sequentially engage stationary contacts 106 and 107. The distance between contacts 104 and 106 is less than the distance between contacts 105 and 107 so that upon a decrease in temperature existing in the space to be heated, contact 104 is caused to engage contact 106 before contact 105 engages contact 107. Connected to a binding post which secures the thermostat 103 in position is one end of a wire 108, the other end of the wire 108 being connected to a heating element 109 which is located in close proximity to the bimetal of the thermostat 103.

One end of the secondary 97 of the step-down transformer 96 is connected by means of a wire 110 to the stationary contact 106. The other stationary contact 107 is connected by means of a wire 111 to one end of a relay coil 112. The other end of the relay coil 112 is connected by means of a wire 113 to the other end of secondary 97 of the step-down transformer 96. The heating element 109 is connected by means of a wire 114 to a contact 115. Coacting with the stationary contact 115 and adapted to engage the same at predetermined times is a switch arm 116 which is connected by means of a wire 117 to the point of connection of wire 111 with the relay coil 112. Upon energization of relay coil 112, the switch arm 116 is moved into engagement with the contact 115 and upon deenergization thereof the switch arm 116 is moved out of engagement with the contact 115 by some biasing means such as a spring or weight, not shown.

One end of the secondary 102 of the step-down transformer 101 is connected by means of a wire 118 to a switch arm 119. The switch arm 119 is operatively connected to the switch arm 116 and consequently upon energization of the relay coil 112, the switch arm 119 is moved to the left into engagement with a stationary contact 120 and upon deenergization of the relay coil 112, the switch arm 119 is moved out of engagement with the contact 120 and into engagement with contact 121. The contact 120 is connected by means of a wire 122 to the damper motor 86 and the contact 121 is also connected by means of a wire 123 to the damper motor 86. The damper motor 86 is in turn connected by means of a wire 124 to the secondary 102 of the step-down transformer 101. When the switch arm 119 is moved into engagement with the contact 120 a circuit is completed from the secondary 102 of the step-down transformer 101 through wire 118, switch arm 119, contact 120, wire 122, damper motor 86 and wire 124 back to the secondary 102 to cause energization of damper motor 86 to move a draft door 81 and the damper 78 to open position. Upon engagement of the switch arm 119 with the contact 121, a circuit is completed from the secondary 102 of the step-down transformer 101 through wire 118, switch arm 119, wire 123, damper motor 86 and wire 124 back to the secondary 102 of the step-down transformer 101 to cause energization of the damper motor 86 to move the draft door 81 and the damper 78 to closed position.

Upon a decrease in temperature existing in the space to be heated, contact 104 is moved into engagement with contact 106 but since switch arm 116 is out of engagement with its contact 115 no circuit is completed by this movement. Upon a further slight decrease in temperature existing within the space to be heated, contact 105 is moved into engagement with contact 107 and a circuit is completed from the secondary 97 of the step-down transformer 96 through wire 110, contacts 106 and 104, contacts 105 and 107, wire 111, relay coil 112 and wire 113 back to the secondary 97 of the step-down transformer 96. Upon completion of this circuit, the relay coil 112 is energized to move switch arm 116 into engagement with the contact 115 thereby completing a second circuit from the secondary 97 of step-down transformer 96 through wire 110, contacts 106 and 104, thermostat 103, wire 108, heater 109, wire 114, contact 115, switch arm 116, wire 117, relay coil 112 and wire 113 back to the secondary 97 of the step-down transformer 96. Since the resistance through this second circuit is greater than the resistance through the first mentioned circuit, there will be very little current flowing through this second circuit, practically all of the current flowing through the first mentioned circuit there being practically no heat given off by the heating element 109. Upon a rise in temperature in the space to be heated, the thermostatic element 103 will cause contact 105 to move out of engagement with contact 107 thereby breaking the first circuit but leaving the second circuit closed. Upon breaking this first circuit, all of the current passes through the second circuit causing heating of the heating element 109. Since the heating element 109 is located adjacent to the bimetal of the thermostat 103, this heating element causes heating of the bimetal and consequent movement of the contact 104 out of engagement with the contact 106 to break this second circuit to cause deenergization of relay coil 112 to move switch arm 116 out of engagement with the contact 115 and to move switch arm 119 out of engagement with contact 120 and into engagement with contact 121. By reason of this heating element 109, the circuit opening action of the thermostat is hastened so that the temperature of the room or space to be heated will not have to rise so high to cause opening of the second circuit and consequent deenergization of relay coil 112. By reason of this heat anticipating effect given to the thermostat 103, "over-shooting" is largely prevented in this modification which tends to give uniform and accurate control of the temperature existing within the rooms or spaces to be heated.

From the above, it is seen that I have provided in this modification a control system for a heating system, having a heater and heating fluid conveying means adapted to heat a space which control system comprises: a fan for circulating fluid through the fluid conducting means; a fan switch responsive to a predetermined high temperature of the heater for starting the fan and responsive to a predetermined low temperature for stopping the fan; a damper in the fluid conducting means for controlling the rate of flow of heating fluid which is moved to open or closed positions according to variations in room temperature; a draft door for controlling the draft through the heater and consequently the temperature thereof which is opened or closed according to variations in room temperature; and an auxiliary heater type thermostat for controlling the opening and closing movements of the draft door and the damper whereby "over-shooting" is largely prevented.

Various modifications may be made in the system embodying my invention without departing from the spirit and scope thereof and I desire therefore that only such limitations shall be placed therein as are imposed by the prior art or set forth in the appended claims.

I claim as my invention:

1. In a heating system of the class described, a space to be heated, a heater for heating said space to be heated, means associated with said heater for conducting heating fluid to and from said space to be heated, means responsive to heater conditions for circulating said heating fluid through said conducting means, valve means responsive to temperature changes in said space to be heated for controlling the circulation of said heating fluid, and means for limiting closing movement of said valve means.

2. In a heating system having an air heater, a duct for conveying heated air to a space to be heated and a return duct for returning air to the heater, the combination of means for circulating air through the heater and ducts, a damper in the return duct for controlling the rate of circulation of air, means responsive to heater temperature for placing the circulating means in operation, and means responsive to space temperature for controlling said damper.

3. In a heating system having an air heater, a duct for conveying heated air to a space to be heated and a return duct for returning air to the heater, the combination of means for circulating air through the heater and ducts, a damper in the return duct for controlling the rate of circulation of air, means responsive to heater temperature for placing the circulating means in operation, means responsive to space temperature for controlling said damper, and means for limiting closing movement of said damper.

4. In combination with a heating system having a heater and heating fluid conducting means for heating a space, means responsive to selected differential heater conditions for starting and stopping circulation of said heating fluid, and temperature responsive means for modulating the rate of circulation according to variations in the space temperature.

5. In a heating system having a heater and heating fluid conducting means for heating a space, means responsive to selected high temperatures of said heater for starting circulation of said heating fluid and to selected low temperatures of said heater for stopping circulation of said heating fluid, and temperature responsive means for modulating the rate of circulation according to variations in the space temperature.

6. In a heating system having an air heater, a duct for conveying heated air to a space to be heated and a return duct for returning air to the heater, the combination of means for circulating air through the heater and ducts, a damper in the return duct for controlling the rate of circulation of air, means responsive to heater temperature for placing the circulating means in operation, and control means responsive to variations in space temperature for controlling said damper to modulate said damper in accordance with space temperature variations.

7. In a heating system having an air heater, a duct for conveying heated air to a space to be heated and a return duct for returning air to the heater, the combination of a damper in the return duct, control means for changing the heating effect of the heater, means responsive to space temperature for controlling said damper and said control means, and means responsive to heater temperatures for preventing said space temperature responsive means from controlling said control means.

8. In a heating system of the class described, a space to be heated, a heater, means for conducting heating fluid between said heater and said space to be heated, means for modulating the rate of circulation of said heating fluid and the heating effect of said heater according to variations in the space temperature, and means responsive to the heating effect of the heater conditions for also controlling the heating effect of said heater.

9. The combination with a heating system having a heater and fluid conducting means for heating a space, of control means for modulating the rate of circulation of heating fluid and the temperature of said heater according to variations in the space temperature, and means responsive to a predetermined heater temperature for preventing said control means from controlling the temperature of said heater.

10. In a heating system, a space to be heated, a heater for heating said space, movable means for modulating the rate of circulation of heating fluid from said heater to said space to be heated according to space temperature variations, means responsive to the movement of said movable means for modulatingly controlling the temperature of said heater according to space temperature variations, and means responsive to heater temperatures for rendering said last mentioned means inoperative to control the temperature of said heater.

11. In a heating system having an air heater, a duct for conveying heated air to a space to be heated and a return duct for returning air to the heater, the combination of means for circulating air through the heater and ducts, a damper in the return duct for controlling the rate of circulation of air, control means for changing the heating effect of said heater, means responsive to heater temperature for placing the circulating means in operation, and means responsive to space temperature for controlling said damper and said control means.

12. In a heating system having an air heater, a duct for conveying heated air to a space to be heated and a return duct for returning air to the heater, the combination of means for circulating air through the heater and ducts, a damper in the return duct for controlling the rate of circulation of air, control means for changing the heating effect of said heater, means responsive to heater temperature for placing the circulating means in operation, means responsive to space temperature for controlling said damper and said control means, and means for limiting closing movement of said damper.

13. In combination with a heating system having a heater and heating fluid conducting means for heating a space, means responsive to selected differential heater conditions for starting and stopping the circulation of heating fluid through said conducting means, means responsive to variations in space temperature for modulating the rate of circulation of said heating fluid, and means responsive to said last mentioned means for modulatingly controlling the condition of said heater in proportion to variations in space temperature.

14. In a heating system having an air heater, a duct for conveying heated air to a space to be heated and a return duct for returning air to the heater, the combination of means for circulating air through the heater and ducts, a damper in the return duct for controlling the rate of circulation of air, control means for changing the heating effect of said heater, means responsive to heater temperature for placing the circulating means in operation, and control means responsivle to variations in space temperature for modulating said damper and said control means.

15. In a heating system having a heater and heating fluid conducting means for heating a space, means responsive to heater conditions for controlling the starting and stopping of circulation of heating fluid, damper means responsive to variations in space temperature for controlling the amount of heating fluid circulated, and means responsive to heater conditions and to variations in space temperature for controlling the condition of said heater.

16. In a heating system having a heater and heating fluid conducting means for heating a space, means responsive to heater conditions for controlling the starting and stopping of circulation of heating fluid, means including damper means responsive to variations in space temperature for controlling the amount of heating fluid circulated, and means responsive to heater conditions and to said means for controlling the amount of heating fluid circulated for controlling the condition of said heater.

17. The combination with a heating system having a heater and heating fluid conducting means for heating a space, of means responsive to selected heater conditions for starting and stopping the circulation of heating fluid, means for proportionately controlling the circulation of heating fluid according to variations in space temperature, means for proportionately controlling the condition of said heater in response to variations in space temperature and means responsive to heater conditions for rendering said last mentioned means inoperative to control the condition of said heater.

18. In a heating system having a heater and heating fluid conducting means adapted to heat a space, the combination of a fan for circulating fluid through said fluid conducting means, thermostatic means responsive to a predetermined high temperature of said heater for starting said fan and responsive to a predetermined low temperature for stopping said fan, valve means in said fluid conducting means for controlling the rate of flow of said heating fluid therein, proportioning motor means responsive to variations in space temperature for operating said valve means, means for controlling the flow of fuel to said heater, proportioning means controlled by said proportioning motor means for operating said fuel controlling means, and thermostatic means responsive to a predetermined high temperature of said heater for rendering said proportioning means inoperative to control said fuel controlling means.

19. In combination with a heating system having a heater and heating fluid conducting means for heating a space, a fan for circulating fluid through said fluid conducting means, thermostatic means responsive to a predetermined high temperature of said heater for starting said fan and responsive to a predetermined low temperature for stopping said fan, valve means in said fluid conducting means for controlling the rate of flow of said heating fluid therethrough, draft means for controlling the temperature of said heater, motor means for operating said valve means and said draft means, and an auxiliary heater type space thermostat for controlling said motor means.

20. A heating circulating system comprising, a heater, a circulating system for conducting a heating medium from said heater to a space to be heated, means for inducing circulation of said heating medium in said circulating system, means for automatically causing operation or cessation of said circulation inducing means when said heater is above or below, respectively, a predetermined temperature and damper means for automatically varying the delivery capacity of said circulation inducing means responsive to temperature changes in the space to be heated.

21. A heating circulating system comprising, a warm air heating furnace, means to conduct heated air from said furnace to a space to be heated, a fan to circulate air from said furnace to said space, automatic means for causing continuous and constant speed operation of said fan at all times when the heat of said furnace is above a predetermined degree and cessation of operation below said predetermined degree, means for varying the delivery capacity of said fan, said means being variable during the operation of said fan and electric means controlled by the temperature in said space to actuate said means for varying the delivery capacity.

ARTHUR C. GRANT.